April 10, 1934.  C. R. WASEIGE  1,954,436
APPARATUS FOR DRIVING ROTARY AIR COMPRESSORS BY SUPERCHARGED ENGINES
Filed Jan. 7, 1930  6 Sheets-Sheet 1

C. R. Waseige
INVENTOR

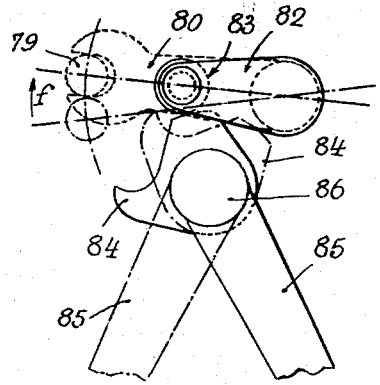
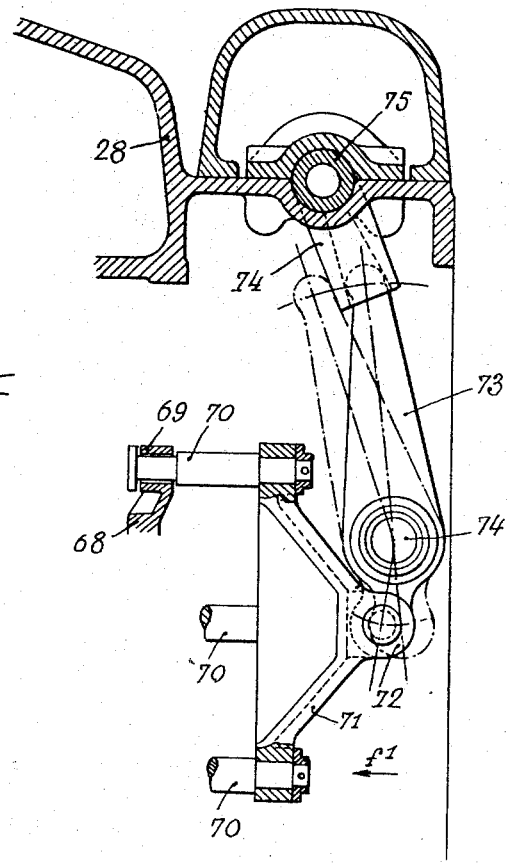
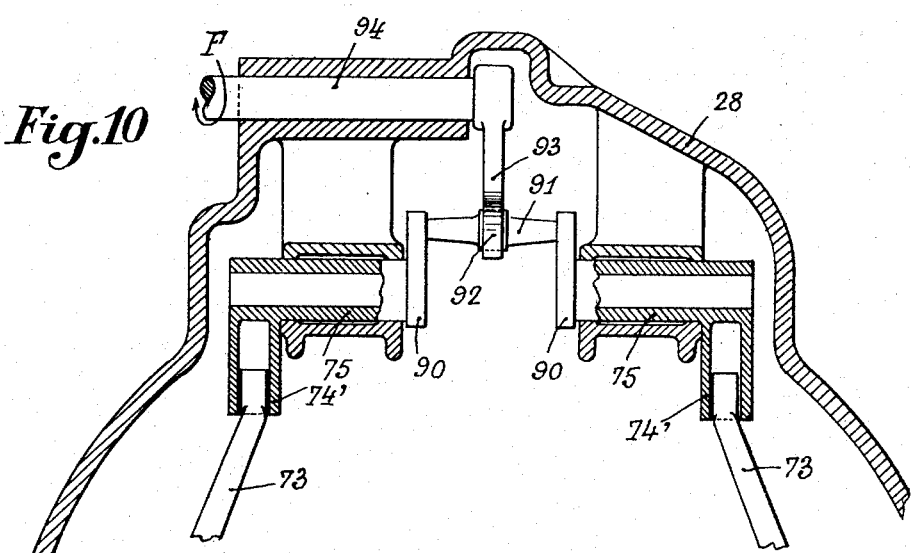

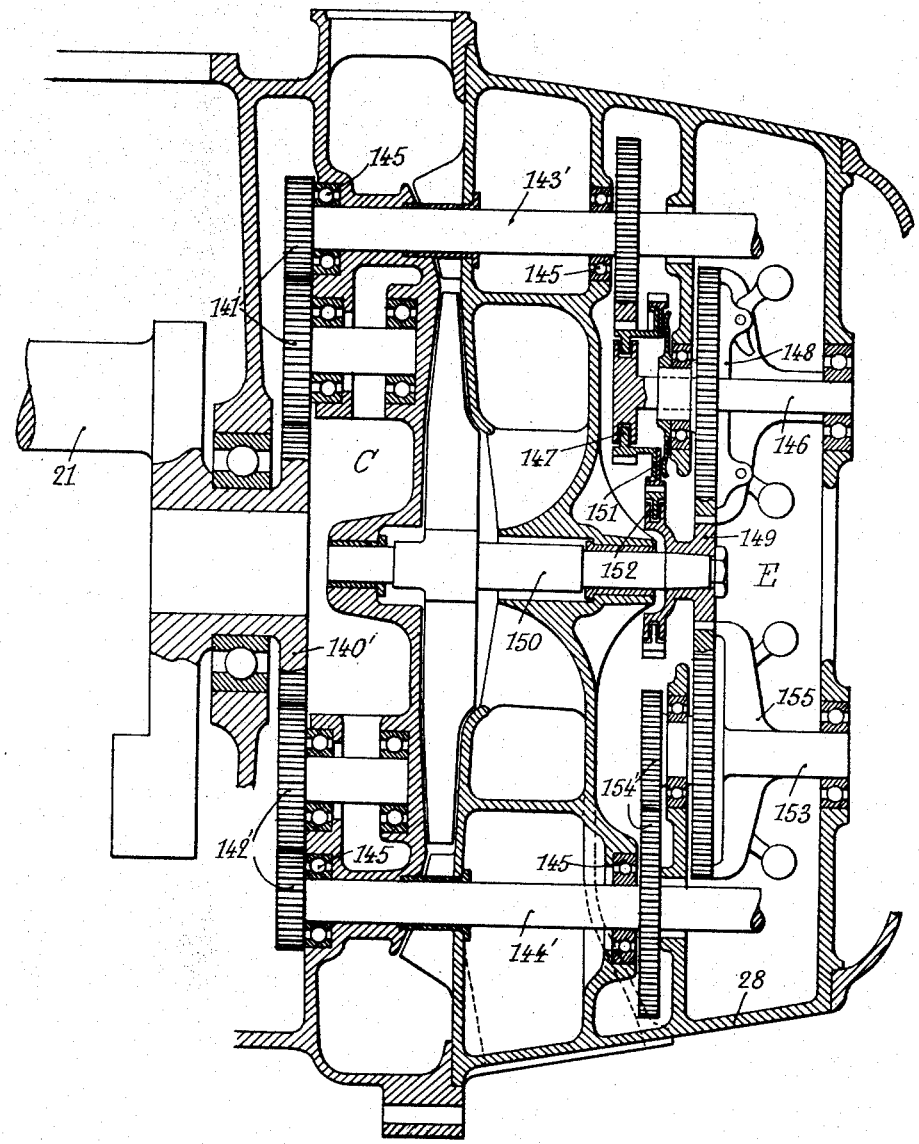

Patented Apr. 10, 1934

1,954,436

UNITED STATES PATENT OFFICE

1,954,436

APPARATUS FOR DRIVING ROTARY AIR COMPRESSORS BY SUPERCHARGED ENGINES

Charles Raymond Waseige, Rueil, France, assignor, by mesne assignments, to Eclipse Aviation Corporation, East Orange, N. J., a corporation of New Jersey Application January 7, 1930, Serial No. 419,187
In France January 25, 1929

20 Claims. (Cl. 74—59)

The present invention relates in general to internal combustion engines, and more particularly to engines for aircraft.

It is known that researches for improved operation of internal combustion engines in general, and chiefly for the engines employed upon aircraft, have led to the use of compressors or blowers adapted to increase the pressure of the engine supply. In order to maintain the proper pressure at the admission according to the operating conditions, and in the case of aircraft engines, according to the altitude, that is, according to the prevailing air pressure, the compressors or blowers must be operated at variable speeds. When the speed ratio between the engine and the compressor or blower is invariable, it is customary in order to prevent all excessive pressure at the admission in certain conditions of functioning, to shut off the gas, to throttle the suction of the compressor, or to directly connect the delivery end to the suction end of the compressor.

However, this method of operating has the serious drawback consisting in the fact that the driving of the compressor or blower requires a power which is out of proportion to the output and pressure required by the engine. For this reason, the known apparatus operate with a great loss of power and hence with an additional consumption of fuel.

The primary object of the invention is to provide a mechanical driving arrangement by which the supercharger may be rotated at higher and higher speeds when the flying height increases.

Another object is to enable the pilot to control the supercharger to cause it at will and as desired to rotate at any one of a number of speeds whatever may be the engine speed; a further object is to permit the pilot to pass from a given supercharger speed to a higher one without being obliged to first reduce the engine speed, i. e. without first unclutching an actual driving connection before clutching another one.

With these and other objects in view, the invention consists in the novel features and combinations of parts as hereafter described and more fully pointed out in the claims.

An essential feature of the invention resides in the interposition between the engine and the supercharger of a mechanical driving device affording various operating ratios.

The mechanical parts of said device may obviously differ within wide limits. For instance, it is possible to dispose between the shaft of the engine and the shaft of the compressor or blower a certain number of sets of countershaft gearing, whether simple or multiple, each set corresponding to a given speed ratio. Each gear set may be actuated by suitable means, firstly by displacing the gear wheels themselves for mutual engagement, or secondly, with the gear wheels in constant engagement, by the use of a sliding member whereby the said gear wheels will be placed in or out of engagement with a countershaft; thirdly, by a known mechanical clutch adapted for mutual connection of gear wheels mounted on a common countershaft.

In a general manner, it is possible to employ any mechanical combination operating after the manner of the usual change-speed device employed upon motor vehicles, and thus introducing a variable ratio of power transmission between the engine shaft and the compressor shaft.

In the accompanying drawings, Figs. 1 and 2 are diagrammatic views showing by way of example two embodiments of the invention. A mechanical form of construction is shown in detail, and solely by way of example, in Figs. 3 to 11.

Fig. 7 is a lengthwise section of the high speed controlling device shown in Fig. 4.

Fig. 8 is a plan view of the external portion of the casing enclosing the controlling devices shown in Figs. 4 and 7.

Fig. 9 is a sectional view showing a detail of construction.

Fig. 10 shows a modification of the controlling devices represented in Figs. 4 and 7.

Fig. 11 is a diagrammatic view of a modification in which various countershafts traverse the compressor.

Figure 1:
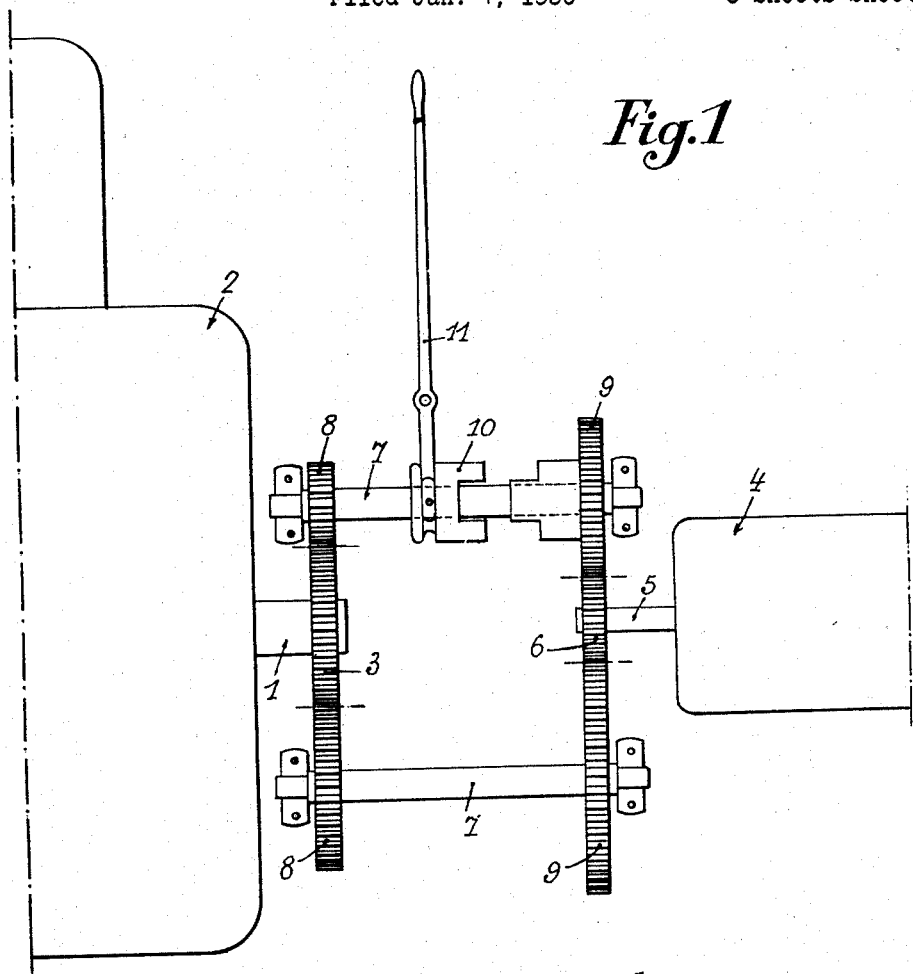

In the example shown in Fig. 1, an actuating shaft 1, driven by the engine 2, serves to drive a gear wheel 3. On the other hand, the air compressor or blower 4 is driven by an actuated shaft 5 upon which is mounted a gear wheel 6. The connection between the gear wheels 3 and 6 is obtained by means of countershafts such as 7, whereof each is supported in the known manner by bearings; each shaft carries a gear wheel 8 engaged with the driving gear wheel 3, and also carries a gear wheel 9 which may be brought into engagement with the gear wheel 6, or it may be constantly engaged with this gear wheel but is loose on the countershaft and is driven at will by any suitable means by which it may be connected to the said countershaft, for instance by a movable member 10 slidable on said shaft but rotatable with the same.

There are disposed around the axes (optionally in line) of the shafts 1 and 5, as many countershafts analogous to the countershaft 7 as are necessary to obtain the requisite number of speeds for the utilization of the compressor, as above specified.

To assure a better distribution of the stresses upon the gearing, it is possible to dispose on the periphery of the gear wheels 3 and 6 a plurality of countershaft devices such as 7 having the same gear ratio. Each countershaft may be combined with a controlling arrangement such as the one herein described, or any other known arrangement, or controlling means may be employed enabling the combined operation of clutches disposed upon the different countershafts, or of a certain number of said clutches.

The operating arrangement shown in the drawings relates to the case in which the gear wheels 9 and 6 are in constant engagement, and in this event the movable member 10 comprises projections cooperating with like projections on the gear wheel 9. The member 10 is displaced by a lever 11 or by other means.

Figure 2:
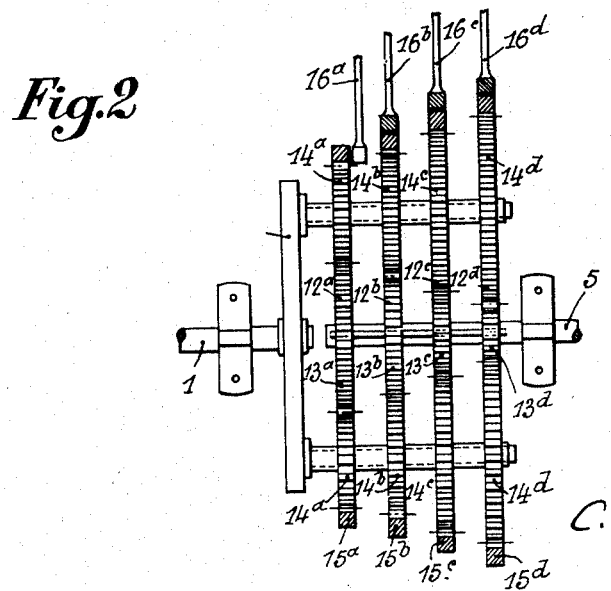

In the construction shown in Fig. 2, the driving shaft 1 and the actuated shaft 5 are connected together by a certain number of sets of epicycloidal gearing $12^a$—$12^b$—$12^c$—$12^d$ having different gear ratios; $13^a$—$13^b$—$13^c$—$13^d$ represent the elements of the different gear sets which are keyed to the actuated shaft 5; $14^a$—$14^b$—$14^c$—$14^d$ are planetary pinions mounted on a carrier 14 which rotates together with the said driving shaft 1. The internal gears $15^a$—$15^b$—$15^c$—$15^d$ of these different gear sets may be held fast or braked by a suitable device $16^a$—$16^b$—$16^c$—$16^d$, known per se.

To further assure the proper distribution of the stresses, it is possible to dispose in the same plane of rotation a plurality of epicycloidal gear sets having the same ratio.

If it is supposed by way of example that the internal gear $15^a$ is held fast at any given time, the planetary pinion $14^a$ which is rotated by the shaft 1 will roll upon the said internal gear $15^a$ and will thus rotate the wheel $13^a$ at a speed which has a given ratio with reference to the driving shaft 1.

It is thus observed that by braking or stopping either of the said outer internal gears, this will afford a whole series of power transmission ratios between the driving shaft and the compressor shaft.

Obviously, the invention is not limited to the two forms of construction herein specified, and it comprises all mechanical connections assuring a variable power transmission ratio between the driving shaft and the compressor shaft.

The mechanical embodiment illustrated in Figs. 3 to 11 will be described in detail by way of example.

Figure 3:
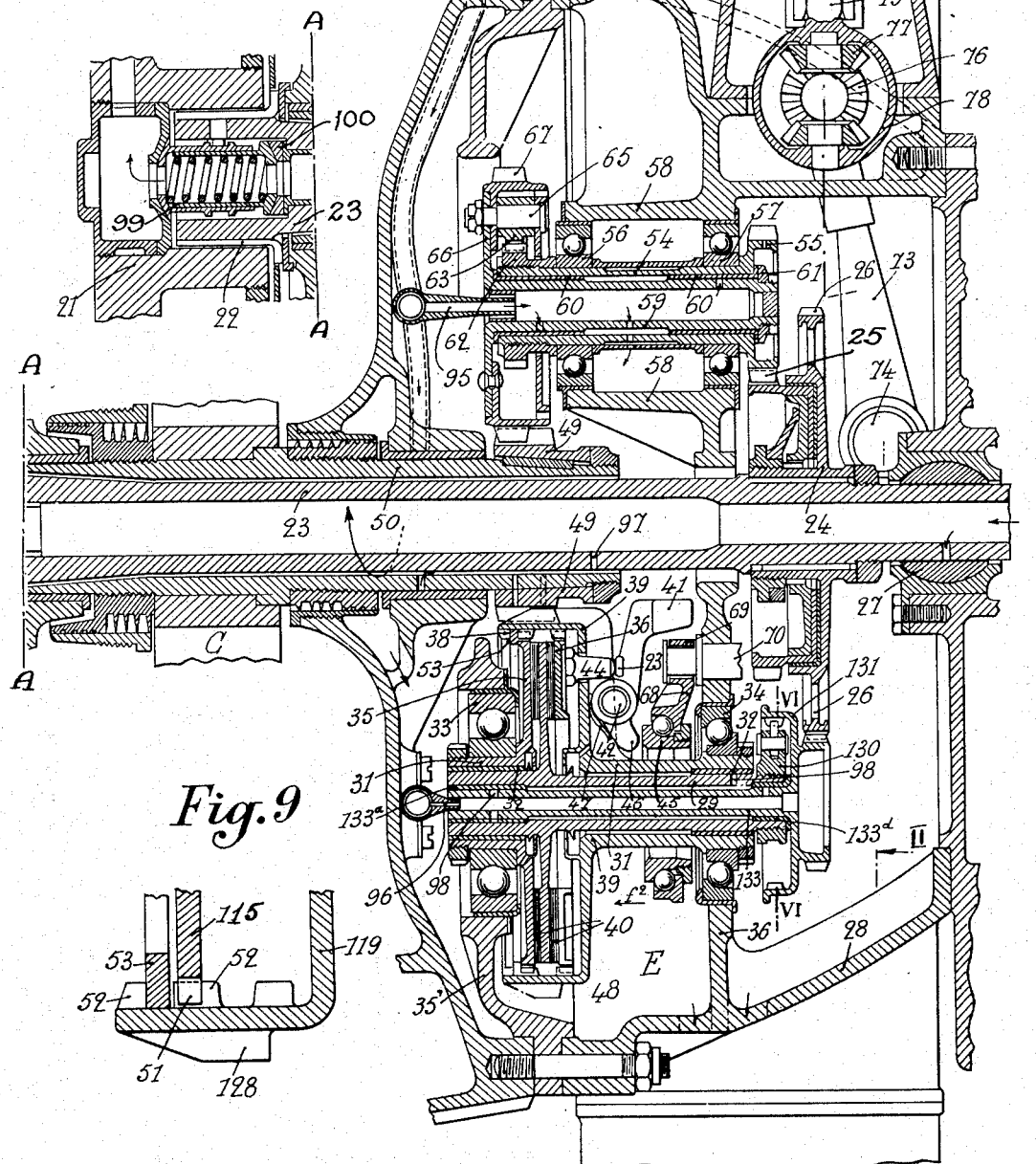
Fig. 3 is a longitudinal section on the line I—I of Fig. 4 showing in the upper part of the figure the device for the slow speed operating of the compressor, and in the lower part, the device for the mean speed operating of the said compressor.

In the construction shown in Fig. 3, 21 is the engine crankshaft, and it drives by means of a set of grooves and projections 22 an intermediate hollow shaft 23 which carries at the outer end a wheel 24 having two sets of teeth of different diameters 25—26 which are integral with or secured to the said wheel 24 and may be provided with a device for limiting the torque, this latter being generally associated with the toothed element adapted to actuate the slow speed countershafts. The hollow shaft 23 has a sufficient length to entirely traverse the compressor C which is to be driven by the said crankshaft 21 and the driving device according to the invention which is designated in a general manner by E in Fig. 3. The shaft 23 is sufficiently elastic to absorb all vibrations and flexions transmitted by the crankshaft 21 which are prejudicial to the teeth of the gear wheels to be further specified. As herein represented, the shaft 23 is supported at one end in the crankshaft 21 by which it is driven, and is supported at the other end by a bearing 27 mounted on the casing of the said actuating device E. The gear wheel 24 and hence the teeth 25—26 are constantly actuated at the same speed as the crankshaft 21. The said teeth 25—26 serve to actuate the compressor at slow speed, mean speed or high speed, through the intermediary of devices which will be further specified.

The device for the high-speed driving of the compressor C comprises two countershafts 109 (Figs. 4 and 5) which are symmetrically disposed with reference to the shaft 23, each shaft being provided with a friction clutch, known per se. As the two countershafts 109 form, with the elements which they carry, two identical groups or devices (Fig. 4), only one of such devices will be specified in the following description. Due note should however be taken of the special arrangement of the said clutches which are mounted on a shaft rotating at greater speed than the crankshaft, thus having a greater flying force whereby a smaller clutch device will impart a greater torque, which is an advantage.

Figure 5:
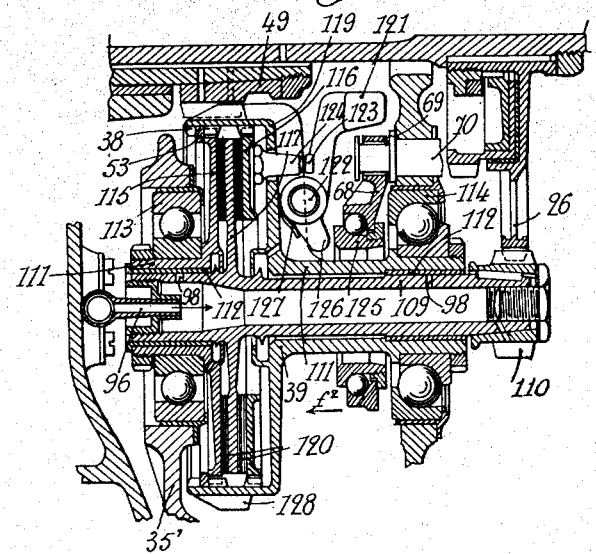
Fig. 5 is a section on the line III—III of Fig. 4, showing the arrangement for high speed operating.
Figure 6:
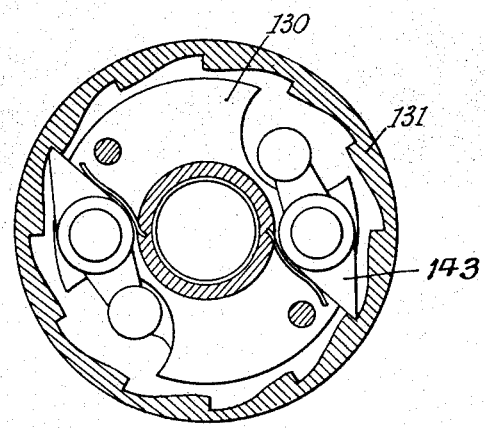
Fig. 6 is a section on the line VI—VI of Fig. 3, showing the loose wheel device employed for the mean speed.

The countershaft 109 is provided with a pinion 110 engaging teeth 26 of the wheel 24; said shaft 109 is rotatable, within a two-part hollow shaft 111, in smooth bearings 112, the said hollow shaft being mounted in ball bearings 113—114, supported by partitions disposed in a case 28. One of the aforesaid bearings may support an axial thrust. The disposition of the two shafts 109 and 111 is such that their relative speeds will be a minimum. As herein represented, the shaft 109 is connected to the hollow shaft 111 by a centrifugal friction clutch, known per se, and which is described only by way of explanation. For this purpose, the hollow shaft 111 carries the actuated disks 115—116 of the clutch, whose driving disk 117 is mounted on the countershaft 109. As shown in Fig. 5, the actuated disks 115—116 are situated on the respective sides of the driving disk 117. The said actuated disks 115—116 are connected at their periphery, by means which will be further described, to a cup-shaped member 119 secured to the hollow shaft 111. The aforesaid clutch device is completed by friction disks 120 disposed between the driving and the actuated disks of the clutch, and thus the driving disk 117 can operate the said actuated disks 115—116 when the pivoted levers 121—122—123 make contact by centrifugal action in the known manner with nibs 124 mounted on the disk 116. To release the clutch, that is, to cease the action of the said levers 121—122—123 upon the nibs 124, said levers are controlled by a stop 125 slidable on the shaft 111 and acting upon arms 126, against springs 127. In conformity to the invention, the said cup-shaped member 119 carries teeth 128 at the periphery engaging a pinion 49 keyed to the shaft 50 of the compressor C, which shaft is concentric with the shaft 23.

With reference to the preceding, it will be readily understood that when the said clutch device is engaged, the motion of the crankshaft 21 will be imparted to the shaft 50 of the compressor by the hollow shaft 23, the teeth 26, the pinion 110, the countershaft 109, the said clutch, the teeth 128, and the pinion 49. On the contrary, when the clutch device is released, the cup-shaped member 119 is no longer rotated, and the compressor shaft will now rotate at a speed differing from the high speed, as determined by other connecting means. It should be noted that the use of two power transmission devices of the kind specified, which are symmetrically disposed with reference to the compressor shaft, provides for the proper distribution of the reactions occasioned by the great stresses required to drive the rotor of the compressor, upon the teeth 128 of the two clutch devices. It is obviously feasible to employ more than the two clutch devices if necessary.

The said pivoting levers 121, and in general the entire clutch device, are so disposed that in the case in which two or more clutches are employed for a single speed, the torque imparted by each clutch cannot differ by more than a certain predetermined quantity, which is usually as small as possible, in order to avoid all lack of symmetry in the distribution of the stresses imparted to the pinion 49 of the compressor shaft 50.

As concerns the construction of the friction clutch itself, Fig. 9 shows a detail of the assembling of the cup-shaped member 119 and the clutch disk 115, and it is observed that the said disk carries at its periphery suitable grooves and projections 51 cooperating with projections or teeth formed in the said cup-shaped member, and said teeth are held in engagement by a split abutment ring 53 engaged in an annular groove formed in the cup-shaped member. This method of securing the parts forms part of the invention.

The arrangement for driving the compressor C at slow speed is shown in the upper half of Fig. 3. It comprises a countershaft 54 carrying at one end a pinion 55 engaging teeth 25 of the wheel 24. The said shaft 54 is hollow, and it is rotatable in smooth or ball bearings 56—57 mounted in partitions 58 of the main casing 28, and it is traversed upon its whole length by a shaft 59 rotatable in smooth bearings 60 disposed in the said hollow shaft 54, but is held against lengthwise motion by a stop 61. The hollow shaft 54 and the shaft 59 are connected together by a ratchet device consisting of the ratchet wheel 62 secured to said hollow shaft 54 and cooperating with pawls 63, urged by springs 64, which are pivotally mounted on axles 65 of a disk 66 keyed to the shaft 59. The construction is such that the pawls 63 will engage their ratchet wheel 62 only when the speed of the disk 66 does not exceed that of the shaft 54. As herein represented, the said disk 66 carries at its periphery suitable teeth 67 cooperating with the pinion 49 keyed to the shaft 50 of the compressor C.

Considering solely the said slow-speed arrangement, it is observed that when the pawls 63 are engaged with their ratchet wheel 62, the compressor shaft 50 will be driven by the crankshaft 21, the shaft 23, the teeth 25, the pinion 55, the shaft 54, shaft 59, the teeth 67 and the pinion 49. As above stated, this driving ceases when the said pawls are released from their ratchet wheel 62. The power transmission ratio obtained by the said slow-speed driving arrangement may have any desired value; it should however preferably be such that the speed of the compressor will exceed that of the crankshaft but will be less than the speed afforded by the driving arrangements employed for the high and the mean speeds.

In a general manner, the said pawls 63 will be released when the aforesaid high and mean speed arrangements are put in action; the pawls will again engage their ratchet wheel 62 when the high and means speed arrangements cease to act and the speed of the compressor shaft diminishes and returns to the slow speed. Thus the compressor C will be constantly driven by the crankshaft 21, either by the high speed mechanism or by the mean speed mechanism, or finally, by the slow speed mechanism.

The arrangement for mean speed comprises a countershaft mechanism cooperating with a ratchet wheel device (or any free wheel device) and with a clutch of the same kind as used in the high speed device (Fig. 5). The said mechanism essentially consists of a hollow shaft 31 traversed by a hollow shaft 29, said shafts having the same disposition as the aforesaid shafts 109 and 111. However, the shaft 29 carries no teeth, but is provided with a ratchet wheel 130 mounted on a shaft, and comprising a reaction spring, as described for the slow speed arrangement; the corresponding ratchet wheel 131 is secured to the teeth 132, analogous to the teeth 110 used for high speed, and driven by the teeth 26 of the wheel 24. The ratchet wheel 131 and the teeth 132 are secured to a shaft 133 traversing the hollow shaft 29 in which it is supported by two bearings 133ª. This affords a unilateral connection between the teeth 132 and the driving disk 37 of the mean speed clutch; this latter, known per se, is controlled by a set of levers.

It is evident that for a single mean speed, the apparatus may comprise one or more countershaft mechanisms provided with a clutch control, as specified for the high speed, and it may also comprise several intermediate speeds between the high speed and the slow speed, provided each speed is obtained by means of at least, one countershaft device as above specified relative to the countershaft device for the mean speed. This construction affords 3, 4 or more different speeds for the compressor for given speed of the engine.

The aforesaid apparatus is completed by a device for the simultaneous control of the two high speed countershaft mechanisms, and for this purpose, the outer part 68 of each stop 125 acting upon the arm 126 of the pivoting levers 121—122—123, carries three arms 69 (Figs. 4 to 7) connected by three rods 70 to an actuating disk 71 carrying a fork 72; in the said fork is mounted one end of a lever 73 pivoted at 74 to an axle mounted on the main casing 28; the other end of said lever 73 is engaged in a recessed lever 74' which is secured to a shaft 75 rotatable in suitable bearings in said casing 28 and carrying at the end a bevel pinion 76. The two bevel pinions 76, each corresponding to one of the high speed clutches, engage two other bevel pinions 77 whose axis is perpendicular to that of the pinions 76, thus forming a differential arrangement.

The pinions 77 are rotatable on a spider 78 which is actuated by a member carrying an entraining arm 79 engaged in a groove in a lever 80 secured to a driving shaft 81 traversing the main casing and controlled from the exterior by any suitable means.

Figure 4:
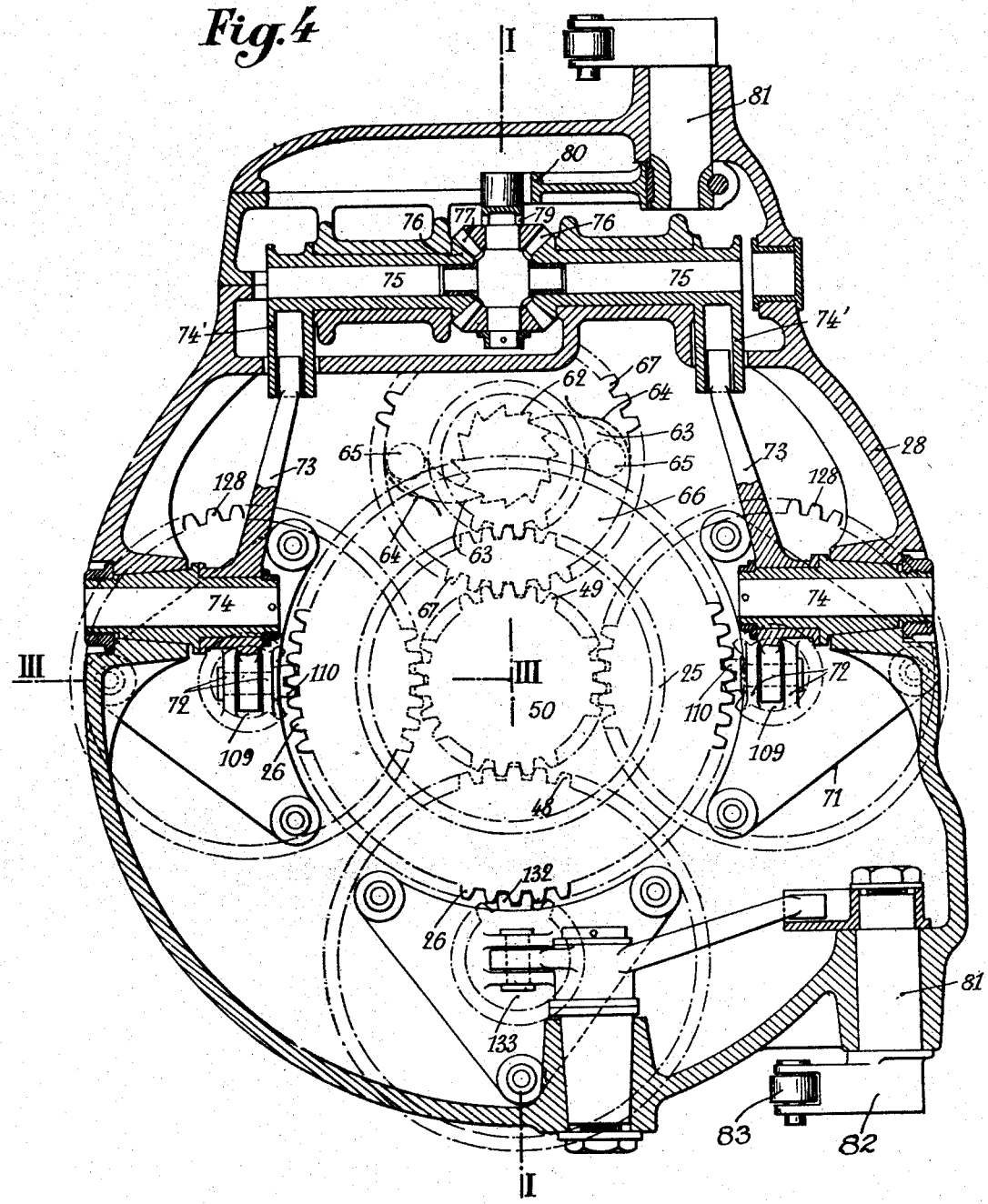
Fig. 4 is an end view, partly in section on the line II—II of Fig. 3, showing the disposition of the shafts and the countershaft gearing for the high speed, mean speed and slow speed, also comprising a cross section of the controlling devices for proceeding from the high speed to the mean and the slow speed, and inversely.

In addition to the device controlling the high speed clutches, the apparatus comprises a distinct control for each set of mean speed clutches, that is, in the case of Figs. 3 and 4, a single control for mean speed which is terminated by a shaft 81.

By way of example, the device actuating the shaft 81 may have the construction shown in Fig. 8 and this comprises in the known manner a lever 82 mounted on the shaft 81 and provided with a roller 83 engaging a cam 84 mounted on an operating lever having an axle 86. In the known manner, the said cam 84 affords a greater reduction ratio at the start of the unclutching when the stress is at the maximum, and this ratio will decrease as the stress employed diminishes towards the end of the stroke.

The operation of the device controlling the clutches is as follows: The said clutches being in the coupled position (Fig. 3), the lever 85 is in the position shown in the dotted lines in Fig. 8. For the unclutching, the lever 85 is turned into the position shown in the full lines in Fig. 8, and during this motion, the cam 84 turns the lever 82 and with it the shaft 81 according to the arrow $f$; said shaft 81—through the medium of the lever 80—rotates the spider 78. By means of the bevel pinions 77 and 76, this rotates the shafts 75, and these shafts will turn the levers 73 in the direction of the arrows $f^1$ (Fig. 7). This motion of the levers 73 is imparted by the disks 71 to the rods 70, which move each stop 45 in the direction of the arrows $f^2$ (Fig. 3), thus separating the said pivoting levers 41—42—43 from the nibs 44, against their springs. The clutch action thus takes place in the contrary direction. While the clutches are being released, the springs 47 and the levers 41—42—43 will exercise a thrust upon the stops 45 by means of the arms 46; and this thrust, imparted to the lever 82 by the rods 70, the disks 71 etc., will hold the said roller 83 against the cam 84, thus causing said roller to follow the cam when the lever 85 is brought from the clutching to the releasing position.

The general operation of the device by which the compressor C is driven by the engine is as follows: The engine is supposed to be running, and the clutches for the mean and the high speed drive are in the released position. Herein the crankshaft 21 will actuate the hollow shaft 23 at a speed N, and said shaft thus drives the shaft 109 at a speed $N^1$ and also drives the shafts 29 at a speed $N^2$ and the shaft 54 at a speed $N^3$. The speeds $N^1$ $N^2$ $N^3$ will depend solely upon the constructional features of the apparatus.

*Slow speed.*—In this case, which is the one in which the shaft 50 of the compressor is driven by the slow speed device, the levers 41—42—43, and 121—122—123, are separated from the nibs 44—124 by the stops 45—125; thus the actuated disks of the clutches, as well as the shafts 31 and 111, will rotate, due to the engagement of the teeth 48 and 128 with 49, at a speed $N^4$ for 111 and $N^5$ for 31, which differ from the speed $N^1$ of shaft 109 and $N^2$ of shaft 29. These speeds $N^4$—$N^5$ will depend upon the constructional features, and in particular, upon the teeth 48—128—49. Such speeds will also be respectively below $N^1$ and $N^2$. At the same time, since the shaft 54 rotates at the speed $N^3$, the ratchet wheel will actuate the shaft 59 and the internal gear 66 by means of the pawls 63 which are maintained by the springs 64. Hence the crankshaft will rotate the compressor shaft 50 at slow speed by means of the teeth 25—55—67—49.

*Mean speed.*—The crankshaft 21 continues to rotate at the same speed as before, that is, the speed of the shaft 23 remains at N; if now the mean speed clutch is thrown on, this causes the actuated disks 35—36—39 to proceed from the speed $N^5$ to speed $N^2$, and thus the compressor shaft will be rotated at mean speed by the teeth 48—49. During this time, since the speed $N^3$ of the shaft 54 has not varied, and the internal gear 66, engaged with the pinion 49, will now be driven at a speed $N^6$ exceeding $N^3$. When the speed of the internal gear 66 exceeds the speed $N^3$, the pawls 63 are released from their ratchet wheel 62, and the said internal gear will rotate loosely. Thus the shaft 54 continues to turn at the speed $N^3$ imparted to it by the teeth 25—55, and the slow speed device has no further action in the driving of the compressor.

On the other hand, the speed of the actuating disks 117 of the high speed clutches and of the shafts 109 has not varied, but the actuated disks 115—116—119 and the shafts 111 now operate at the speed $N^7$, below the speed $N^1$, and hence these clutches have no further action in the driving of the compressor.

*High speed.*—The shaft 23 still operating at the speed N, if the high speed clutch device is now thrown on, the actuated disks 115—116—119 and the shafts 111 will proceed from the speed $N^7$ to speed $N^1$. The compressor shaft will thus be driven at high speed by the teeth 128 and 49. During this time, since the speeds $N^2$ $N^3$ of shafts 29—54 have not varied, the internal gear 66 and the teeth 48 cooperating with 49 will proceed to the speeds $N^8$ $N^9$ exceeding $N^2$ $N^6$. When the speed of 66 and 48 increases, the pawls of the loose wheel 63 used for slow speed, and of the loose wheel 131 used for mean speed will be released from the ratchet wheels 62 and 131, and the internal gear 66 now turns loose with the shaft 59, as well as the entire means speed clutch device 35—36—39, and will thus have no action in driving the compressor.

When the clutches of the high speed driving device are again brought into the released position, the speed of the actuated disks 115—116—119 now diminishes to the value $N^7$. During this time, the speed of the rotor of the compressor, of the mean speed clutch device 35—36—39, and of the internal gear 66 will also be reduced. When the speed of the said clutch device 35—36—39 has proceeded from $N^8$ to $N^2$, the pawls 143 will again engage their ratchet wheel 131, and the compressor shaft is again actuated at mean speed; the internal gear 66 proceeds at the same time from $N^9$ to $N^6$, the slow speed pawls 63 remaining out of action.

When the mean speed clutch device is released, the speed of the disks 35—36—39 diminishes from $N^2$ to $N^5$, the speed of the disks 115—116—119 from $N^7$ to $N^4$, and the speed of the internal gear 66 from $N^6$ to $N^3$. At this time the pawls 63 are again engaged with the ratchet wheel 62, and thus the compressor is driven at slow speed.

It is observed that according to this operation, the compressor is constantly actuated by the engine at one of the three speeds thus provided.

Fig. 10 shows a modification of the clutch-operating device represented in Figs. 4 to 7. In this apparatus, the shafts 75 connected by hollow levers 74' to levers 73 are not provided with bevel pinions 77, but with arms 90 connected by a transverse shaft 91 engaged in the forked end 92 of a lever 93 secured to a shaft 94 traversing the casing 28; said shaft corresponds to the shaft 81 of the device shown in Fig. 4 and is operated by means such as are shown in Fig. 8, and thus when the shaft 94 is turned in the direction of the arrow F, this will rotate the shafts 75 which thus turn the said levers 74' towards the front of the figure.

The apparatus is lubricated by a supply of oil to the central part through conduits 95—96, by the use of a special circuit, or through holes 97 when the engine lubricating oil circulates in the hollow shaft 23. The oil is supplied to the bearings by ducts 98.

When the oil circulates through the said hollow shaft 23, a leakless device which is unaffected by the oil pressure is disposed between the shaft 23 and the crankshaft 21; said device essentially comprises a two-part collapsible sleeve 99 and a slidable washer 100, allowing all motion of the shaft 23 relatively to the crankshaft 21.

Obviously, the said invention is not limited to the constructions herein described and represented, which are given solely by way of example.

Fig. 11 shows a modification of the change-speed device in which the countershaft devices for the different speeds entirely traverse the compressor C, but without interfering with its operation.

Herein the crankshaft 21 carries a gear wheel 140' which drives—through the medium of like gearing 141' and 142'—two countershafts 143' and 144', each rotatable in ball bearings or other bearings 145 mounted on the casing 28, said shafts entirely traversing the compressor. The shaft 143' drives the mean speed shaft 146 by means of the ratchet wheel 147; and said shaft 146 carries a toothed clutch 148 controlled by centrifugal means, cooperating with a pinion 149 keyed to the compressor shaft 150. The said shaft 146 also drives—through a known device for limiting the torque and suitable gear—the ratchet wheel 152 mounted on the compressor shaft. The countershaft 144' actuates the high speed shaft 153 by the gear 154, and said shaft 153 comprises a centrifugally-controlled clutch 155 cooperating with the pinion 149.

The said apparatus enables the use of countershafts for the control of various accessory devices pertaining to the engine itself.

The details of construction of the clutch devices, of their controlling means, etc. and also the details of their operation, are the same as above described.

Having now described my invention, what I claim as new and desire to secure by Letters Patent is:

1. In a supercharger drive for internal combustion engines, a hollow shaft adapted to be keyed to the rotor of a supercharger, a driving shaft adapted to be rotated from the engine and extending within and through said hollow shaft lengthwise thereof, and a speed increasing arrangement operatively connecting together said driving and hollow shafts on the side of the supercharger opposite the engine, said speed increasing arrangement including a plurality of countershafts equally spaced about the driving shaft and said countershafts having geared connections to both the driving shaft and the hollow shaft.

2. In a supercharging arrangement for internal combustion engines, the provision between the engine shaft and the supercharger shaft of a driving arrangement which includes a plurality of sets of countershafts disposed around the engine shaft, each set comprising a number of coaxial shafts rotatably arranged with respect to one another in such a manner that a shaft serves as a bearing for the adjacent inner one, a driving connection between the shafts of each set, whereby each set comprises a driving shaft and a driven shaft, a driving connection between the driving shaft of each set and the engine shaft and another driving connection between the driven shaft of each set and the supercharger, and means whereby only some of said sets may be operative at a time.

3. In a supercharging arrangement for internal combustion engines, the provision between the engine shaft and the supercharger shaft of a driving arrangement which includes a plurality of sets of countershafts disposed around the engine shaft, each set comprising a number of coaxial shafts rotatably arranged with respect to one another in such a manner that a shaft serves as a bearing for the adjacent inner one, a driving connection between the shafts of each set, whereby each set comprises a driving shaft and a driven shaft, a driving connection between the driving shaft of each set and the engine shaft and another driving connection between the driven shaft of each set and the supercharger, said various driving connections affording different gear ratios between the engine shaft and the supercharger and comprising for the set affording the greater supercharge speed, a toothed wheel secured to the driving shaft of the set, which shaft is the central shaft of the set, said toothed wheel being disposed to permanently mesh with a toothed wheel secured on the engine shaft, a clutch device associated with the set considered, the driven member of the clutch rotatable with the driven shaft of the set being provided with teeth in permanent engagement with corresponding teeth rotatable with the superchanger shaft, means for operating said clutch, and means whereby only the sets affording the same gear ratio between the engine and the supercharger may be operative at a time.

4. In a supercharging arrangement for internal combustion engines, the provision between the engine shaft and the supercharger shaft of a driving arrangement which includes a plurality of sets of countershafts disposed around the engine shaft, each set comprising a number of coaxial shafts rotatably arranged with respect to one another in such a manner that a shaft serves as a bearing for the adjacent inner one, a driving connection between the shafts of each set, whereby each set comprises a driving shaft and a driven shaft, a driving connection between the driving shaft of each set and the engine shaft and another driving connection between the driven shaft of each set and the supercharger, said various driving connections affording different gear ratios between the engine shaft and the supercharger and comprising for each set affording a supercharger speed intermediate the higher and the lower one, a free wheel device, a clutch, a toothed member secured to the driving shaft of the set, which driving shaft is the central shaft of the set, said toothed member being disposed to permanently mesh with a toothed wheel secured on the engine, the free wheel device being interposed between said driving shaft and another or intermediate shaft of the set in order that the pawls or equivalent elements are rotatable with said intermediate shaft and the ratchet wheel with the driving shaft, toothed provided on the driven member of the clutch to permanently mesh with teeth provided on the supercharger shaft and rotatable therewith, which driven member is arranged to rotate with the driven shaft of the set while the driving member is arranged to rotate with said intermediate shaft, means for operating said clutch, a free wheel device interposed in the driving connection affording the lower supercharger speed and a clutch in the driving connection providing the higher supercharger speed.

5. In a supercharging arrangement for internal combustion engines, the provision between the engine shaft and the supercharger shaft of a driving arrangement which includes a plurality of sets of countershafts disposed around the engine shaft, each set comprising a number of coaxial shafts rotatably arranged with respect to one another in such a manner that a shaft serves as a bearing for the adjacent inner one, a driving connection between the shafts of each set, whereby each set comprises a driving shaft and a driven shaft, a driving connection between the driving shaft of each set and the engine shaft and another driving connection between the driven shaft of each set and the supercharger, said various driving connections affording different gear ratios between the engine shaft and the supercharger and comprising for the set affording the lower supercharger speed a free wheel device interposed between the driving shaft and the driven shaft of the set and arranged in such a manner that the ratchet wheel is rotatable with the driving shaft and the pawls or equivalent elements with the driven shaft, a toothed wheel rotatable with the driving shaft and arranged to permanently mesh with teeth provided on the engine shaft, while the ratchet wheel is provided with teeth disposed to permanently engage teeth provided on the supercharger shaft and rotatable therewith.

6. In a supercharging arrangement as claimed in claim 2, the feature residing in that the central shafts of the sets are hollow in order to serve as oil conduits, while the various shafts are provided with ports in their walls, and the provision of means for centrally supplying oil within said hollow shafts, whereby the lubrication will be afforded by centrifugal splashing.

7. In a supercharger drive, an engine shaft, a driven shaft, a plurality of mechanical driving connections interposed between the engine shaft and said driven shaft and affording a plurality of various gear ratios between the engine and the driven shaft although some of them have the same gear ratio, said driving connections which have the same gear ratio being arranged to engage the driven shaft at points substantially equally spaced on its periphery in order that the thrusts on said shaft will be substantially equilibrated, control means whereby only one driving connection having the same gear ratio will be operative at a time, and means interposed in the driving connections which have the same gear ratio whereby each connection transmits only a fraction of the whole torque, said means being arranged to provide for an angular slide effect as soon as the torque transmitted by any one of said connections tends to exceed said predetermined fraction, so that the torques transmitted by the connections having the same gear ratio may only differ at most by a predetermined amount.

8. A supercharger drive comprising a low speed mechanism, a mean speed mechanism, a high speed mechanism, a centrifugal clutch including weights responsive to supercharger speed for engaging the high speed mechanism, overrunning clutches on the low and mean speed mechanism, a manual control for the mean speed mechanism, and a manual control for the high speed mechanism arranged to contact the weights and depress the same for preventing operation of the high speed mechanism.

9. A supercharger drive comprising a low speed mechanism, a mean speed mechanism, a high speed mechanism, means responsive to supercharger speed for engaging the high and mean speed mechanisms, overrunning clutches on the low and mean speed mechanisms, and manual means for rendering both speed responsive means inoperative.

10. A supercharger drive comprising a low speed mechanism, a mean speed mechanism, a high speed mechanism, a centrifugal clutch including weights responsive to supercharger speed for engaging the high speed mechanism, overrunning clutches for the low and mean speed mechanisms, a manual control for the mean speed mechanism and a manually movable stop arranged to engage said weights and prevent engagement of the centrifugal clutch.

11. A supercharger drive comprising a low speed device, a high speed device, each of said devices including driving and driven shafts, one of said devices having its shafts connected by an overrunning clutch, and the other device having its shafts connected by a speed responsive clutch.

12. A supercharger drive comprising a low speed device, a high speed device, each of said devices including concentric driving and driven shafts, one of said devices having its shafts connected by an overrunning clutch, and the other device having its shafts connected by a speed responsive clutch.

13. A supercharger drive comprising a low speed device, a high speed device, each of said devices including driving and driven shafts, said low speed device having its shafts connected by an overrunning clutch, and said high speed device having its shafts connected by a speed responsive clutch.

14. A supercharger drive comprising a low speed device, a high speed device, each of said devices including driving and driven shafts, said low speed device having its shafts connected by an overrunning clutch, said high speed device having its shafts connected by a speed responsive clutch, and manual means for controlling the speed responsive means.

15. A supercharger drive comprising low, mean and high speed devices, the low speed device having an overrunning clutch, the mean speed device having an overrunning clutch and a speed responsive clutch, and the high speed device having a friction clutch.

16. A supercharger drive comprising low, mean and high speed devices, the low speed device having an overrunning clutch, the mean speed device having an overrunning clutch and a speed responsive clutch, and the high speed device having a speed responsive clutch.

17. A supercharger drive comprising a plurality of selective speed changing mechanisms, the lowest speed having an overrunning clutch and all others except the highest speed having both overrunning clutches and speed responsive clutches.

18. A supercharger drive comprising a plurality of selective speed changing mechanisms, the lowest speed having an overrunning clutch, all others except the highest speed having both overrunning clutches and speed responsive clutches, and manual means for controlling the speed responsive clutches.

19. In a supercharger drive, a driving shaft, a driven shaft, a plurality of mechanical driving connections interposed between the driving shaft and driven shaft and affording a plurality of various gear ratios between the shafts, some of which have the same driving ratio, said driving connections which have the same ratio being arranged to engage the driven shaft at points substantially equally spaced on its periphery in order that the thrusts on said shaft will be equilibrated, control means whereby only one of the driving connections having different gear ratio will be operative at a time, centrifugal clutches in said driving connections, a single controlling lever, means operatively connecting said lever to each of said clutches affording the same gear ratio and said connecting means affording the same gear ratio including an equilibrated power transmitting device for equalizing the stresses imparted to said clutches.

20. In a supercharger drive, a driving shaft, a driven shaft, a plurality of mechanical driving connections interposed between the driving shaft and driven shaft and affording a plurality of various gear ratios between the shafts, some of which have the same driving ratio, said driving connections which have the same ratio being arranged to engage the driven shaft at points substantially equally spaced on its periphery in order that the thrusts on said shaft will be equilibrated, control means whereby only one of the driving connections having different gear ratio will be operative at a time, centrifugal clutches in said driving connections, a single controlling lever, means operatively connecting said lever to each of said clutches affording the same gear ratio and said connecting means affording the same gear ratio including a differential power transmitting gear in order to substantially equilibrate the stresses simultaneously imparted to the clutches.

CHARLES RAYMOND WASEIGE.